(12) United States Patent
Lei

(10) Patent No.: US 12,721,317 B2
(45) Date of Patent: Sep. 1, 2026

(54) GRAVITY-POWERED TREADMILL FOR POULTRY

(71) Applicant: Dongguan City GeShengMei Industrial Co., Ltd, Dongguan (CN)

(72) Inventor: Taotao Lei, Dongguan (CN)

(73) Assignee: Dongguan City GeShengMei Industrial Co., Ltd, Dongguan (CN)

( * ) Notice: Subject to any disclaimer, the term of this patent is extended or adjusted under 35 U.S.C. 154(b) by 0 days.

(21) Appl. No.: 19/260,670

(22) Filed: Jul. 7, 2025

(65) Prior Publication Data

US 2025/0331500 A1 Oct. 30, 2025

(30) Foreign Application Priority Data

Apr. 28, 2025 (CN) ......................... 202520839413.2

(51) Int. Cl.
*A01K 15/02* (2006.01)
*A01K 39/012* (2006.01)

(52) U.S. Cl.
CPC ........ *A01K 15/027* (2013.01); *A01K 39/0125* (2013.01)

(58) Field of Classification Search
CPC .... A01K 15/027; A01K 39/012; A01K 39/00; A01K 39/01; A01K 39/0106; A01K 31/22; A01K 31/002; A01K 31/00
See application file for complete search history.

(56) References Cited

U.S. PATENT DOCUMENTS 698,381 A * 4/1902 Gale .................... A01K 15/027 185/17
1,794,951 A * 3/1931 Freer .................... A01K 15/027 119/700
2,467,338 A * 4/1949 Sellards ................ A63B 22/14 D21/830

(Continued)

FOREIGN PATENT DOCUMENTS

DE 202020105851 U1 * 10/2020 ........... A01K 15/027

OTHER PUBLICATIONS

"Making Chicken Exercises" by SimpleCraftHacks1 Youtube, Jul. 7, 2024 https://www.youtube.com/shorts/O5unjmlcJd0?feature=share (Year: 2024).*

(Continued)

*Primary Examiner* — Katelyn T Truong

(57) ABSTRACT

A gravity-powered treadmill for poultry includes a rotating platform driven by a gravity of poultry, a container for holding poultry feed, and a mounting frame for assembling the rotating platform to an external structure. The rotating platform is rotatably mounted on the mounting frame, the rotating platform is inclined relative to a horizontal plane when in use, and the container is arranged beside an upwardly inclined side of the rotating platform. When in use, the rotating platform will rotate downwards due to the gravity of the poultry. The faster the poultry runs upwards, the faster the rotating platform will rotate downwards. As a result, the poultry achieves an exercise effect when eating. Moreover, since the rotation of the rotating platform is driven by the gravity of the poultry without an additional power source, making the structure simple and the cost low.

9 Claims, 17 Drawing Sheets

(56) References Cited

U.S. PATENT DOCUMENTS

| | | | | |
|---|---|---|---|---|
| 2,831,457 | A * | 4/1958 | Mcmurry | A01K 15/027 119/701 |
| 4,497,278 | A * | 2/1985 | Balder | A01K 39/0106 119/537 |
| 5,114,390 | A * | 5/1992 | Tribelhorn, Jr. | A01K 15/027 119/700 |
| 2003/0056735 | A1 * | 3/2003 | Hull | A01K 15/02 119/702 |
| 2007/0169706 | A1 * | 7/2007 | Vagedes | A47G 7/044 119/57.8 |
| 2016/0095300 | A1 * | 4/2016 | Steudler, Jr. | A01K 5/0208 119/51.01 |
| 2019/0017286 | A1 * | 1/2019 | Hossain | A01K 31/00 |

OTHER PUBLICATIONS

"Here's how I made my merry-go-round" by ChickenSchmidtFarms on Youtube, Nov. 1, 2023 https://www.youtube.com/shorts/v7_W2cJZdME?feature=share (Year: 2023).*

"Marry Go Round for Chickens" by Hen Hero on Youtube, Jun. 12, 2019 https://youtu.be/ESc_w_upA9o (Year: 2019).*

* cited by examiner

GRAVITY-POWERED TREADMILL FOR POULTRY

CROSS REFERENCE TO RELATED APPLICATIONS

The present application claims the benefit of Chinese Patent Application No. 2025208394132 filed on Apr. 28, 2025, the contents of which are incorporated herein by reference in their entirety.

FIELD OF THE INVENTION

The present invention relates to a device for poultry, and more particularly to a gravity-powered treadmill for poultry to achieve an exercise effect.

BACKGROUND OF THE INVENTION

As is well known, poultry refers to domesticated birds raised mainly for their meat, eggs, and feathers, and also for other purposes. They are generally birds of the Phasianidae and Anatidae families, such as chickens, ducks, geese, and quails, and there are also birds from other families like turkeys, pigeons, and various songbirds.

To promote the growth and health of poultry, poultry raisers introduce corresponding devices to encourage poultry to exercise and move around. However, in the existing devices for poultry exercise and activity, a motor is used as the power source for the driving mechanism, which makes the device have the drawbacks of complex structure, high cost, and poor fitness effect.

Therefore, there is an urgent need for a gravity-powered treadmill for poultry to overcome one or more of the above-mentioned drawbacks.

SUMMARY OF THE INVENTION

The object of the present invention is to provide a gravity-powered treadmill for poultry that has a simple structure, low cost, and good fitness effect.

In order to achieve the above objective, the present invention provides a gravity-powered treadmill for poultry, including a rotating platform driven by a gravity of poultry, a container for holding poultry feed, and a mounting frame for assembling the rotating platform to an external structure. The rotating platform is rotatably mounted on the mounting frame, the rotating platform is inclined relative to a horizontal plane when in use, and the container is arranged beside an upwardly inclined side of the rotating platform.

Compared with the prior art, the rotating platform of the present invention is rotatably assembled on the mounting frame, the rotating platform is inclined relative to the horizontal plane when in use, and the container is arranged beside the upwardly inclined side of the rotating platform. When the poultry jumps onto the rotating platform for eating the feed in the container above the rotating platform, the poultry has to walk towards the upwardly inclined side of the rotating platform. Once the poultry walks upwards, the rotating platform will rotate downwards due to the gravity. The faster the poultry runs upwards, the faster the rotating platform will rotate downwards. Then the poultry will chase after it at an even faster speed, as a result, the poultry achieves an exercise effect when eating. Moreover, since the rotation of the rotating platform is driven by the gravity of the poultry, there is no need to provide a power source, making the structure of the gravity-powered treadmill for poultry of the present invention simple and the cost low.

Preferably, the mounting frame includes a standing support, an intersecting support arranged crosswise with the standing support, and a rotation adjustment device assembled between the standing support and the intersecting support, the rotating platform is rotatably assembled on the standing support from above, a relative position between the standing support and the intersecting support is adjustable via the rotation adjustment device, thereby tilting the rotating platform relative to the horizontal plane.

Preferably, the rotation adjustment device includes an adjusting fastener, a first connecting member and a second connecting member that are crosswise arranged and connected together, the first connecting member is assembled with the standing support, and the second connecting member is assembled with the intersecting support, the adjusting fastener is configured to selectively fasten or unfasten the second connecting member and the intersecting support.

Preferably, the standing support is perpendicular to the rotating platform and the intersecting support respectively.

Preferably, the first connecting member is a tube sleeved over the standing support, the second connecting member is a tube sleeved over the intersecting support, and the adjusting fastener is rotatably inserted through the second connecting member.

Preferably, the second connecting member is provided with a threaded hole for threaded connection with the adjusting fastener, the adjusting fastener is extended into the second connecting member through the threaded hole and is configured to selectively pressed against or release the intersecting support.

Preferably, the intersecting support is a horizontal rod perpendicular to the standing support, and an end of the horizontal rod is connected with a flange seat.

Preferably, the intersecting support includes an intersecting section arranged crosswise the standing support, an aligned section located below the intersecting section and vertically aligned with the standing support, and a curved section connected between the intersecting section and the aligned section; and an end of the aligned section is connected with a flange seat, a base or an insert.

Preferably, the treadmill further includes a connecting rod for connecting the container to the mounting frame, wherein the container is suspended above a corresponding position of the rotating platform via the connecting rod.

Preferably, the treadmill further includes an angle adjusting fastener and an angle adjusting tube for adjusting a position of the container along a rotation direction of the rotating platform, wherein the angle adjusting tube is sleeved over the standing support and rotatable around the standing support, the connecting rod is connected with the angle adjusting tube, and the angle adjusting fastener is inserted through the angle adjusting tube and selectively fasten or unfasten the standing support and the angle adjusting tube.

Preferably, the angle adjusting tube includes a first tube sleeved over the standing support, a second tube intersecting perpendicularly with the first tube, and a fastener inserted through the second tube; an end of the connecting rod is sleeved inside the second tube, the fastener is used to fasten the connecting rod, and the angle adjusting fastener is inserted through the first tube.

Preferably, the connecting rod is in a shape of "L", with one section of the connecting rod spaced parallel below the rotating platform and the other section of the connecting rod spaced laterally beside the rotating platform.

Preferably, the connecting rod is located above the rotating platform and in a shape of "Π".

DETAILED DESCRIPTION OF ILLUSTRATED EMBODIMENTS

To elaborate the technical content and structural features of the present invention, the following detailed description is provided in conjunction with the embodiments and the drawings.

Figure 1:
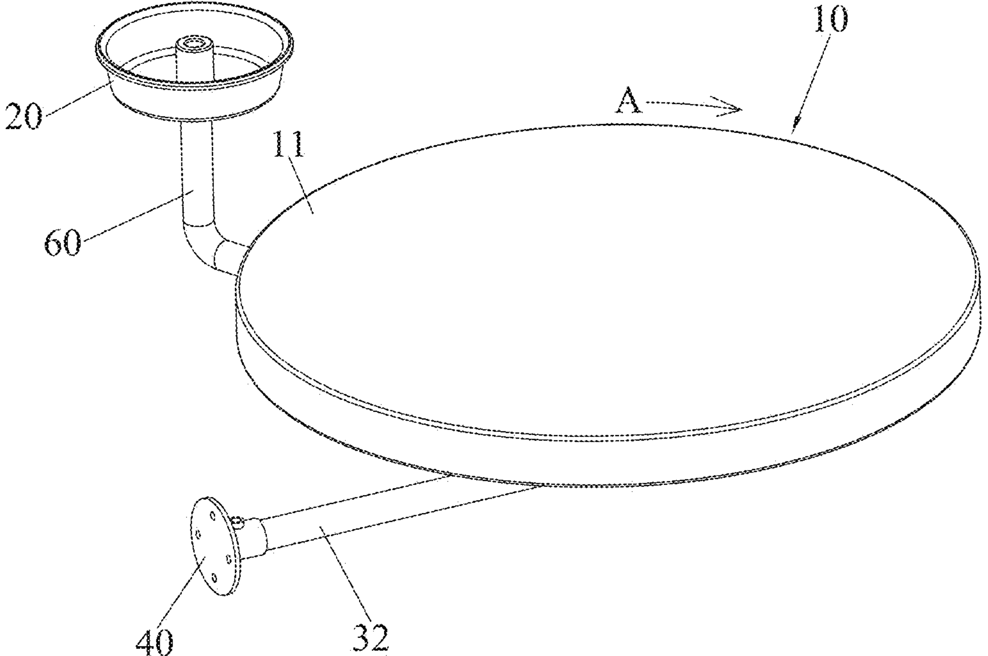
FIG. 1 is a perspective view of the gravity-powered treadmill for poultry according to the first embodiment of the present invention.

Referring to FIG. 1, a gravity-powered treadmill for poultry 100*a* according to the embodiments of the present invention is provided for the fitness exercise for poultry, aiming to promote the growth and ensure the health of poultry.

Figure 2:
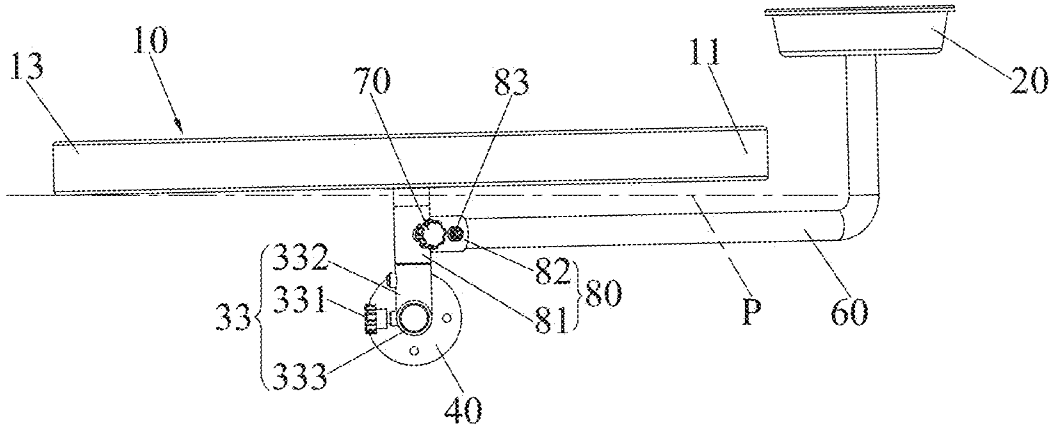
FIG. 2 is a side view of the gravity-powered treadmill for poultry shown in FIG. 1.
Figure 3:
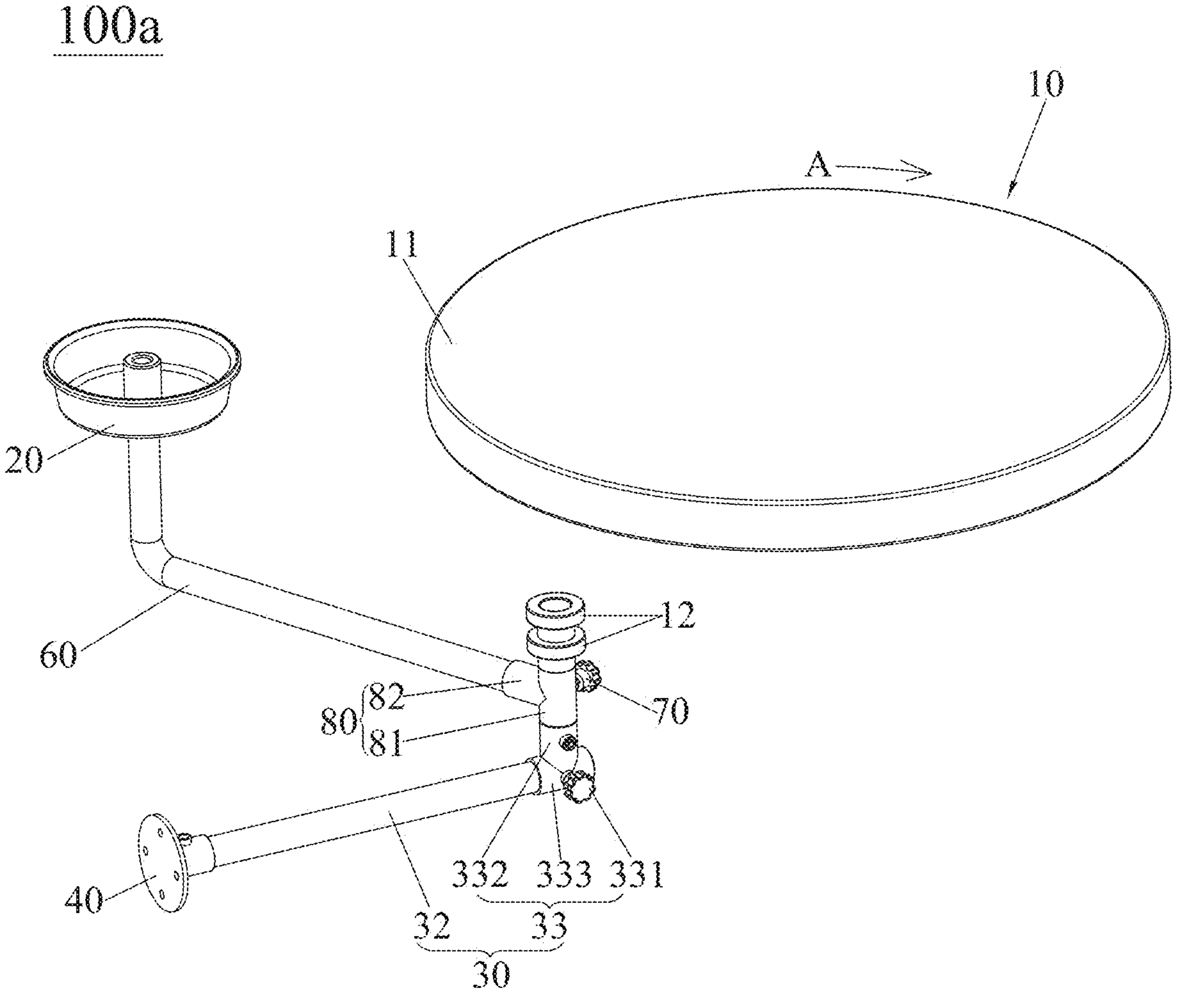
FIG. 3 is an exploded perspective view of the gravity-powered treadmill for poultry shown in FIG. 1.
Figure 4:
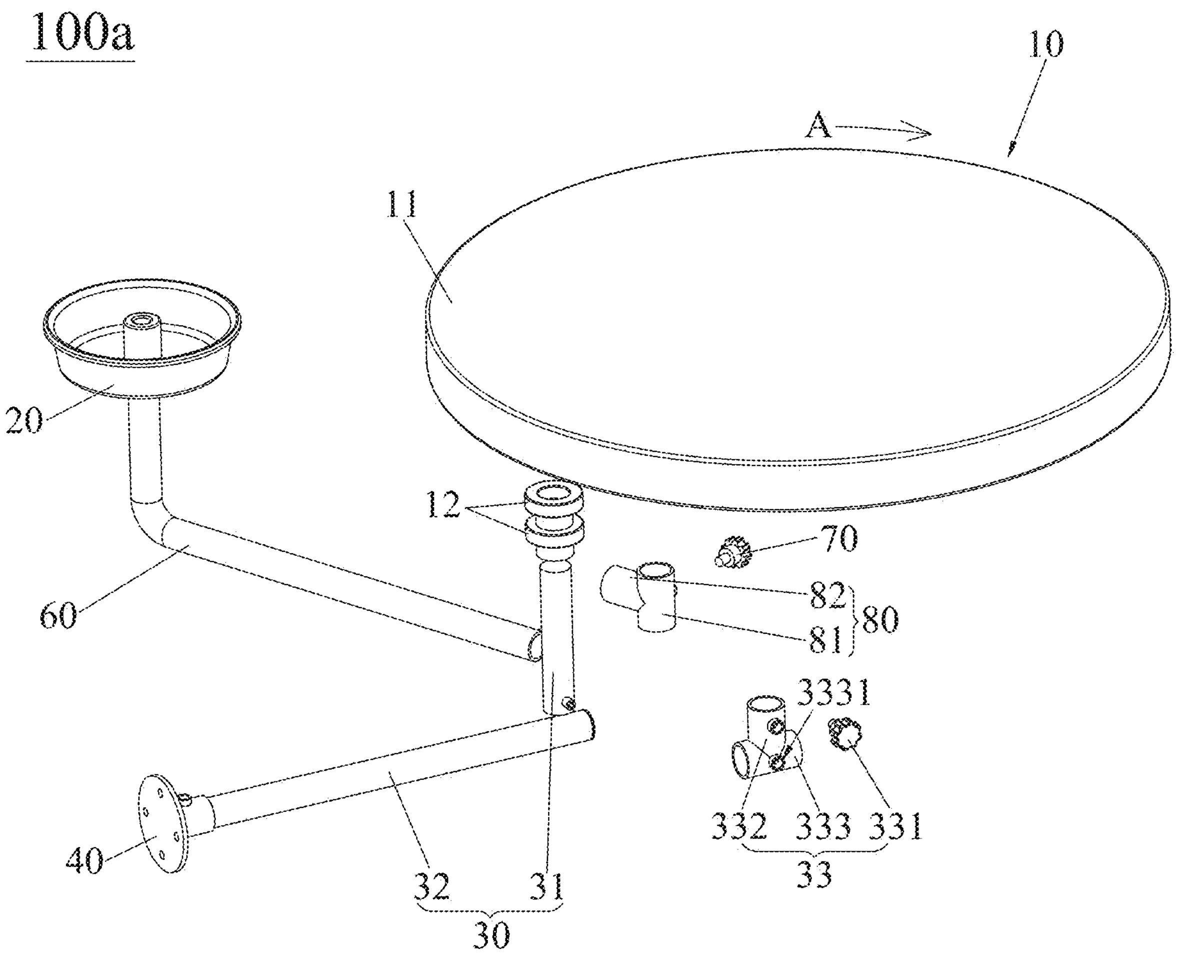
FIG. 4 is a further exploded perspective view of the gravity-powered treadmill for poultry shown in FIG. 3.
Figure 5:
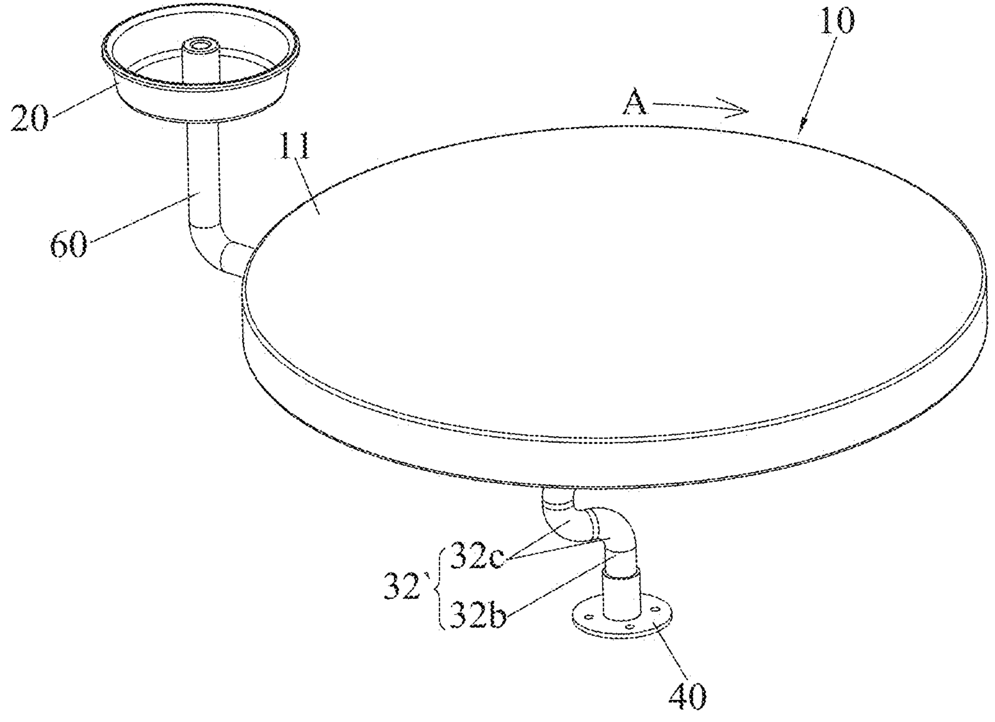
FIG. 5 is a perspective view of the gravity-powered treadmill for poultry according to the second embodiment of the present invention.
Figure 9:
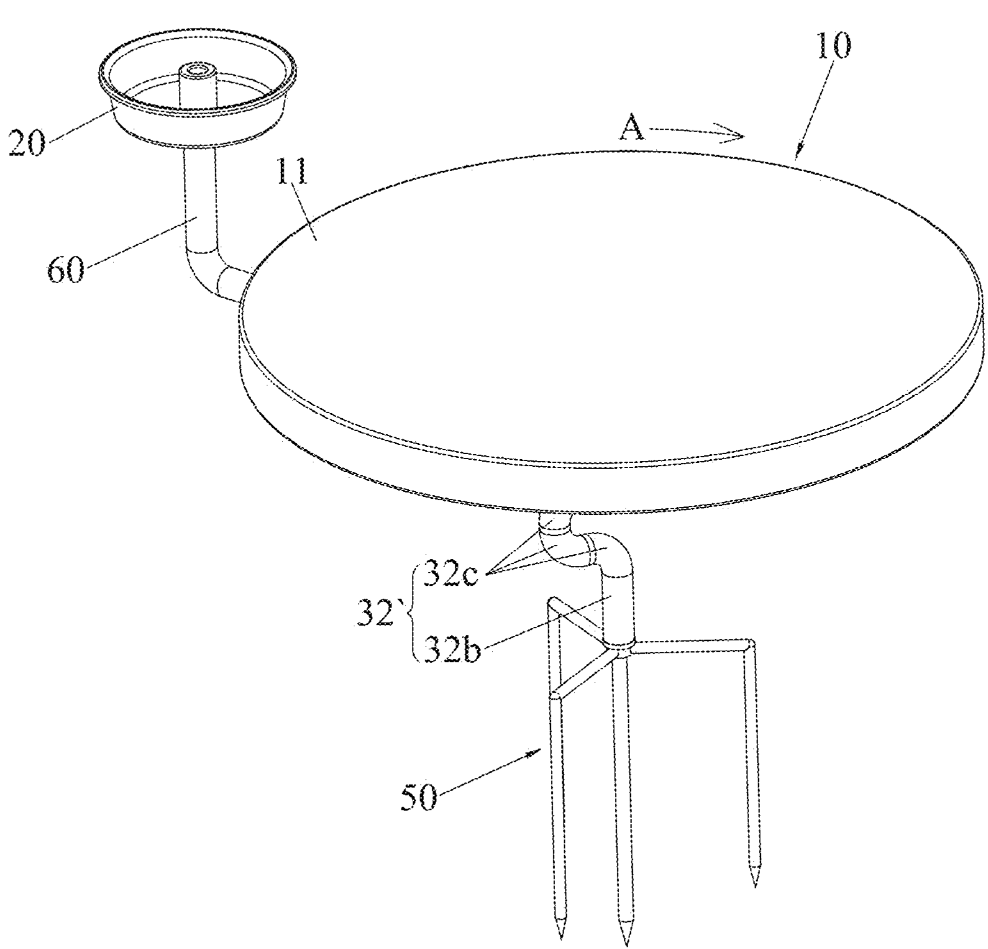
FIG. 9 is a perspective view of the gravity-powered treadmill for poultry according to the third embodiment of the present invention.

Referring to FIGS. 2 to 4, the gravity-powered treadmill for poultry 100*a* of the first embodiment includes a rotating platform 10 driven by the gravity of poultry, a container 20 for holding poultry feed, and a mounting frame 30 for assembling the rotating platform 10 to an external structure. Optionally, as shown in FIGS. 1 to 4, the mounting frame 30 may be fixed on a support, such as a wall. It should be noted that, according to actual needs, the way of fixing the mounting frame 30 to the external structure can also be the way shown in FIGS. 5 and 9, which is not limited to the way shown in FIGS. 1 to 4.

The rotating platform 10 is rotatably assembled on the mounting frame 30, which provides support for the rotating platform 10. The rotating platform 10 is inclined relative to the horizontal plane P when in use. The container 20 is arranged beside an upwardly inclined side of the rotating platform 10, as shown in FIG. 2. Specifically, as shown in FIGS. 1 to 4, the gravity-powered treadmill for poultry 100*a* of the first embodiment also includes a connecting rod 60 for connecting the container 20 to the mounting frame 30. The container 20 is suspended above a position of the rotating platform 10 via the connecting rod 60, as shown in FIG. 2. In other words, both the container 20 and the connecting rod 60 are supported by the mounting frame 30. Therefore, when using the gravity-powered treadmill for poultry 100*a* of the first embodiment, it is only necessary to install the mounting frame 30 to the external structure, which is simpler in installation operation compared with installing the container 20 and the mounting frame 30 to the external structure separately. It should be noted that, although FIGS. 1 to 4 show the connecting rod 60 installed on the mounting frame 30, it is also possible to install the connecting rod 60 to the external structure (such as a wall or ground) according to actual needs.

More specifically, as shown in FIG. 4, the mounting frame 30 includes a standing support 31, an intersecting support 32 arranged crosswise with the standing support 31, and a rotation adjustment device 33 assembled between the standing support 31 and the intersecting support 32. The rotating platform 10 is rotatably assembled on the standing support 31 from above, which provides support for the rotation of the rotating platform 10 and allows the rotating platform 10 to rotate relative to the standing support 31. Optionally, as shown in FIGS. 3 and 4, the rotating platform 10 may be assembled on the standing support 31 via ball bearings 12 to further improve the flexibility and smoothness of the rotation of the rotating platform 10 relative to the standing support 31. It should be noted that, according to actual needs, the rotating platform 10 may also be assembled on the standing support 31 in other rotating ways.

In addition, by means of the rotation adjustment device 33, the relative position between the standing support 31 and the intersecting support 32 is adjustable, so that the rotating platform 10 is inclined relative to the horizontal plane P. On the one hand, it ensures the requirement that the rotating platform 10 is inclined relative to the horizontal plane P after the gravity-powered treadmill for poultry 100*a* of the first embodiment is installed to the external structure. On the other hand, the inclination of the rotating platform 10 relative to the horizontal plane P can be flexibly adjusted according to actual needs, so that the gravity-powered treadmill for poultry 100*a* of the first embodiment has better versatility.

Specifically, as shown in FIGS. 2 to 4, the rotation adjustment device 33 includes an adjusting fastener 331 and a first connecting member 332 and a second connecting member 333 that are crosswise arranged and connected together. The first connecting member 332 is assembled with the standing support. The second connecting member 333 is assembled with the intersecting support 32. The adjusting fastener 331 can selectively fasten or unfasten the second connecting member 333 and the intersecting support 32. When the adjusting fastener 331 unfastens the second connecting member 333 and the intersecting support 32, it allows the operator to manually rotate and adjust the rotating platform 10, the standing support 31, and the rotation adjustment device 33 around the intersecting support 32, thereby achieving the purpose of flexibly adjusting the inclination of the rotating platform 10 relative to the horizontal plane P, and thus simplifying the structure of the rotation adjustment device 33 and the process of adjustment operation.

More specifically, as shown in FIG. 4, the standing support 31 are perpendicular to the rotating platform 10 and the intersecting support 32, respectively, which facilitates the assembly operation of the rotating platform 10 on the standing support 31 and the assembly operation between the standing support 31 and the intersecting support 32. In addition, the first connecting member 332 is a tube sleeved over the standing support 31, and the second connecting member 333 is a tube sleeved over the intersecting support 32. In such a way, the assembly operation is effectively simplified. Moreover, the adjusting fastener 331 is rotatably inserted through the second connecting member 333 to effectively improve the convenience of the adjustment operation. Optionally, as shown in FIG. 4, the second connecting member 333 is provided with a threaded hole 3331 for threaded connection with the adjusting fastener 331. The adjusting fastener 331 extends into the second connecting member 333 through the threaded hole 3331 and can selectively press against or release the intersecting support 32 to further improve the convenience of the adjustment operation. At this time, the adjusting fastener 331 may be a screw with a knurled knob. It should be noted that, as shown in FIG. 4, the first connecting member 332 and the second connecting member 333 are connected to form a "T" shape, which facilitates the manufacture of the first connecting member 332 and the second connecting member 333. It should be noted that, according to actual needs, the first connecting member 332 and the second connecting member 333 may also form other shapes.

As the embodiment shown in FIGS. 1, 3, and 4, the intersecting support 32 is a horizontal rod perpendicular to the standing support 31, and the end of the horizontal rod is connected with a flange seat 40. With the help of the flange seat 40, the assembly operation of the mounting frame 30 with the external structure (such as but not limited to a wall) is convenient, and the stability of the assembly connection between the mounting frame 30 and the external structure is effectively improved. This is because the flange seat 40 has multiple connection positions for assembly connection with the external structure, which are separated from each other in its circumferential direction.

As shown in FIGS. 2 to 4, the gravity-powered treadmill for poultry 100*a* of the first embodiment further includes an angle adjusting fastener 70 and an angle adjusting tube 80 for adjusting the position of the container 20 along the rotation direction of the rotating platform 10 (the direction indicated by arrow A in the figures or the opposite direction). The angle adjusting tube 80 is sleeved over the standing support 31 and can rotate around the standing support 31. The connecting rod 60 is connected with the angle adjusting tube 80. The angle adjusting fastener 70 is inserted through the angle adjusting tube 80 and can selectively fasten or unfasten the standing support 31 and the angle adjusting tube 80. Therefore, when the angle adjusting fastener 70 unlocks the standing support 31 and the angle adjusting tube 80, the operator can manually adjust the position of the container 20 relative to the rotating platform 10, so that the container 20 can be adjusted to a position corresponding to the upwardly inclined side 11 of the rotating platform 10, thus providing better flexibility.

Specifically, as shown in FIGS. 2 to 4, the angle adjusting tube 80 includes a first tube 81 sleeved over the standing support 31, a second tube 82 intersecting perpendicularly with the first tube 81, and a fastener 83 inserted through the second tube 82. The end of the connecting rod 60 is sleeved inside the second tube 82, and the fastener 83 is used to fasten the connecting rod 60, so that the connecting rod 60 is fixed with the second tube 82. The angle adjusting fastener 70 is inserted through the first tube 81 to simplify the structure of the angle adjusting tube 80. In addition, with the help of the fastener 83, the assembly and disassembly operations between the connecting rod 60 and the angle adjusting tube 80 are facilitated. More specifically, as shown in FIGS. 3 and 4, the first tube 81 and the second tube 82 are connected to form a "T" shape, which facilitates the manufacture. It should be noted that, according to actual needs, the first tube 81 and the second tube 82 may also be connected in other forms. In addition, the fastener 83 may be a screw. Moreover, the angle adjusting fastener 70 may be a screw with a knurled knob. The connecting rod 60 is in the shape of "L", so that the connecting rod 60 is more compact with the rotating platform 10.

Referring to FIGS. 5 to 8, the structure of the gravity-powered treadmill for poultry 100*b* of the second embodiment is basically the same as that of the gravity-powered treadmill for poultry 100*a* of the first embodiment, and the difference is the details of the intersecting support 32/32', as specifically described below.

In the gravity-powered treadmill for poultry 100*b* of the second embodiment, the intersecting support 32' includes an intersecting section 32*a* arranged crosswise with the standing support 31, an aligned section 32*b* located below the intersecting section 32*a* and aligned with the standing support 31 in the vertical direction, and a curved section 32*c* connected between the intersecting section 32*a* and the aligned section 32*b*. The end of the aligned section 32*b* is connected with a flange seat 40. In this configuration, the aligned section 32*b* of the gravity-powered treadmill for poultry 100*b* is vertically fixedly connected to the ground. Since the aligned section 32*b* is aligned with the standing support 31 in the vertical direction, it effectively prevents the generation of a moment between the load force acting on the aligned section 32*b* from the ground and the force acting on the standing support 31 from the rotating platform 10, and the gravity-powered treadmill for poultry 100*a* from being easily overturned due to the existence of this moment.

In the gravity-powered treadmill for poultry 100*a* of the first embodiment, the intersecting support 32 is a horizontal rod perpendicular to the standing support 31, which allows the intersecting support 32 to be horizontally mounted on the wall.

Apart from the above differences, the rest structures are the same and will not be repeated here.

Referring to FIGS. 9 to 12, the structure of the gravity-powered treadmill for poultry 100*c* of the third embodiment is basically the same as that of the gravity-powered treadmill for poultry 100*b* of the second embodiment, with the following differences.

In the gravity-powered treadmill for poultry 100*c* of the third embodiment, the end of the aligned section 32*b* is connected with an insert 50. With the help of the insert 50, the gravity-powered treadmill for poultry 100*c* of the third embodiment can be directly inserted into the lawn for fixation, thus providing better flexibility for fixing the gravity-powered treadmill for poultry 100*c* to the external structure.

While in the gravity-powered treadmill for poultry 100*b* of the second embodiment, the end of the aligned section 32*b* is connected with the flange seat 40, by which the gravity-powered treadmill for poultry 100*b* is fixed to the ground. Since the flange seat 40 has multiple connection positions for assembly connection with the external structure, which are separated from each other in the circumferential direction, the stability of the assembly connection between the mounting frame 30 and the external structure is more effectively improved.

Apart from the differences mentioned above, the rest structures are the same and will not be repeated here.

Figure 13:
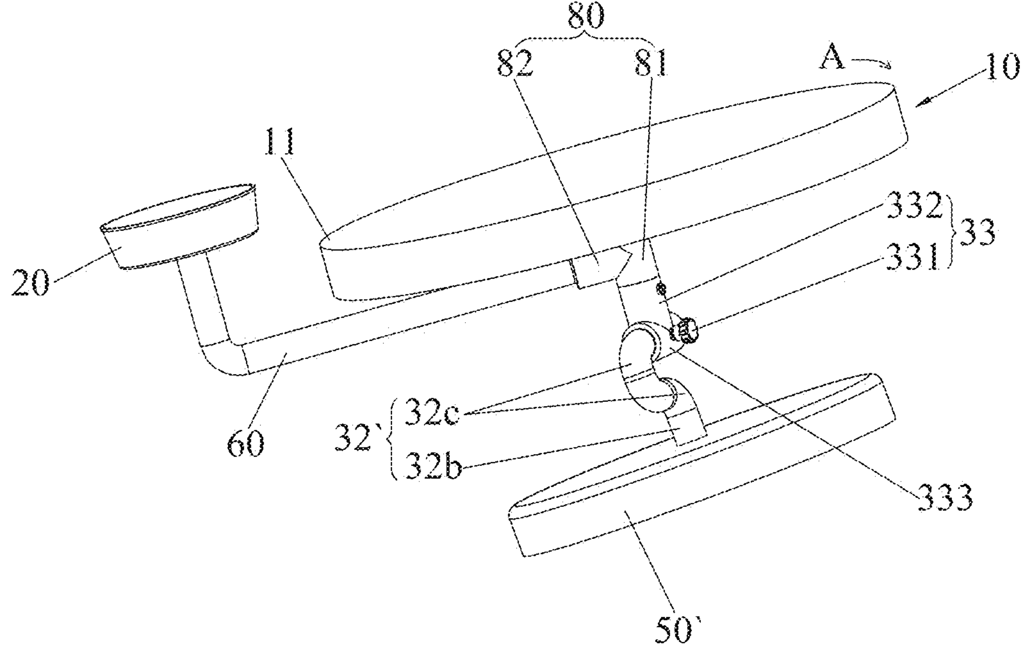
FIG. 13 is a perspective view of the gravity-powered treadmill for poultry according to the fourth embodiment of the present invention.

Referring to FIG. 13, the structure of the gravity-powered treadmill for poultry 100*d* of the fourth embodiment is basically the same as that of the gravity-powered treadmill for poultry 100*c* of the third embodiment, with the following differences.

In the gravity-powered treadmill for poultry 100*d* of the fourth embodiment, the end of the aligned section 32*b* is connected with a base 50', which allows the gravity-powered treadmill for poultry 100*d* of the fourth embodiment to be placed on the ground or other external supports with the help of the base 50', thus the usage of the gravity-powered treadmill for poultry 100*d* of the fourth embodiment is more flexible.

While in the gravity-powered treadmill for poultry 100*c* of the third embodiment, the end of the aligned section 32*b* is connected with the insert 50, which allows the gravity-powered treadmill for poultry 100*c* of the third embodiment to be directly inserted into the lawn for fixation.

Apart from the differences mentioned above, the rest structures are the same and will not be repeated here.

Figure 14:
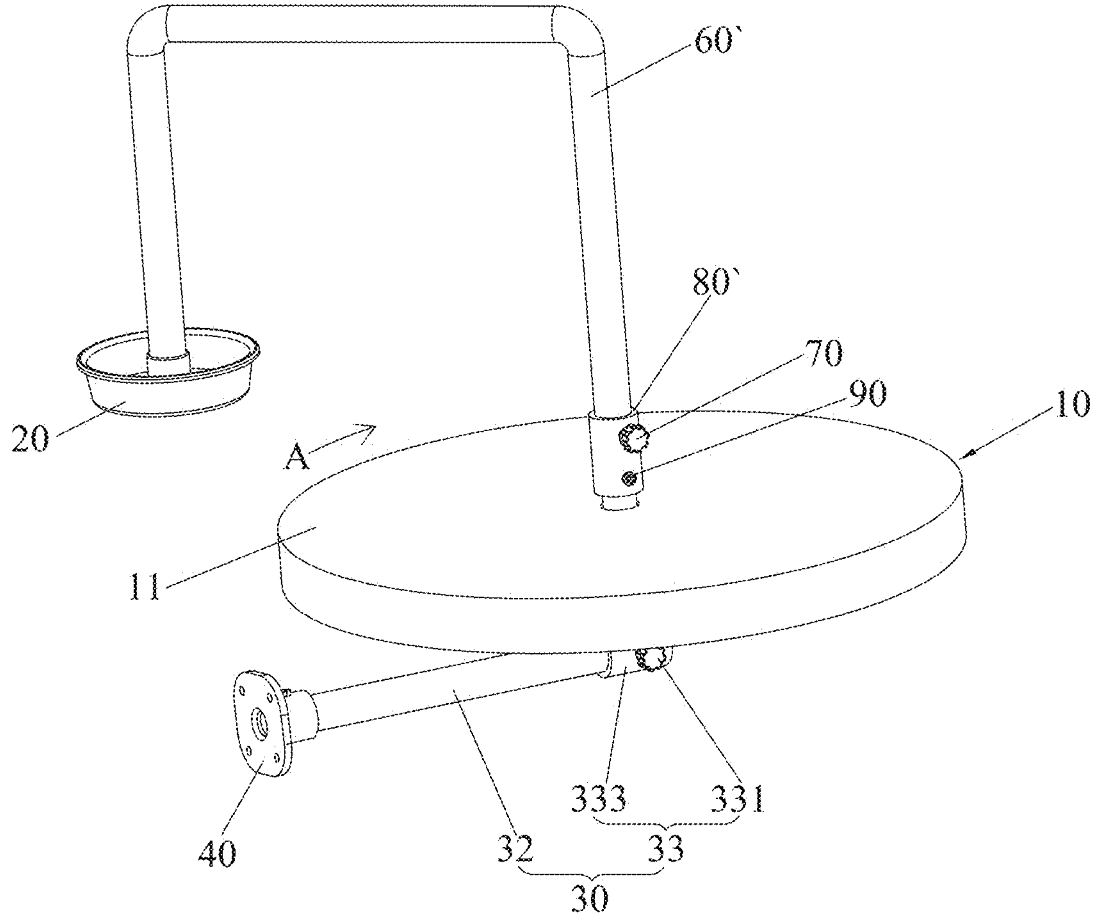
FIG. 14 is a perspective view of the gravity-powered treadmill for poultry according to the fifth embodiment of the present invention.

Referring to FIG. 14, the structure of the gravity-powered treadmill for poultry 100*e* of the fifth embodiment is basically the same as that of the gravity-powered treadmill for poultry 100*a* of the first embodiment, with the following differences.

In the gravity-powered treadmill for poultry 100*e* of the fifth embodiment, the connecting rod 60' is located above the rotating platform 10 and is in the shape of "Π". Correspondingly, the angle adjusting tube 80' is a straight tube, and the angle adjusting tube 80' is fixedly connected with the standing support 31 by means of a fastener 90 (such as a screw).

While in the gravity-powered treadmill for poultry 100*a* of the first embodiment, the connecting rod 60 is in the shape of "L" with one section spaced parallel below the rotating platform 10 and the other section spaced laterally beside the rotating platform 10. Correspondingly, the angle adjusting tube 80 includes the first tube 81 sleeved over the standing support 31, the second tube 82 intersecting perpendicularly with the first tube 81, and the fastener 83 inserted through the second tube 82.

Apart from the differences mentioned above, the rest structures are the same and will not be repeated here.

Figure 15:
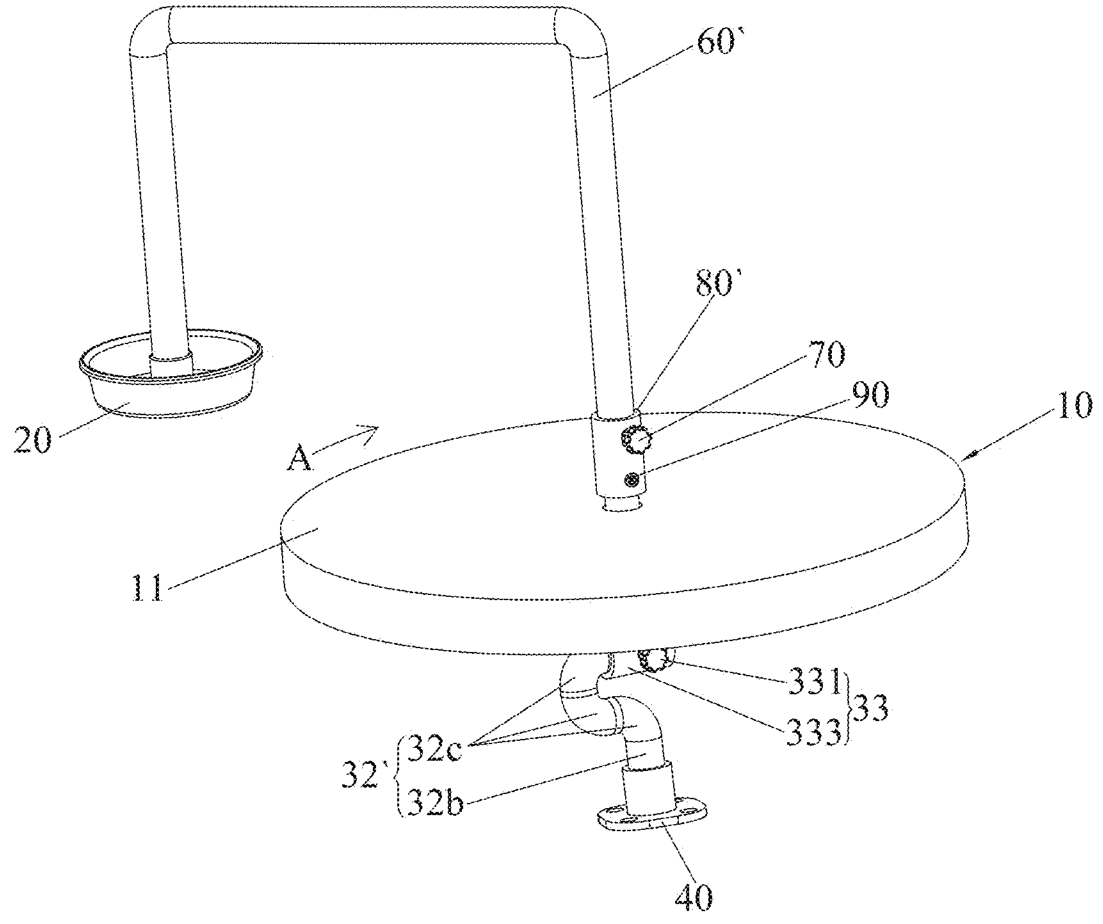
FIG. 15 is a perspective view of the gravity-powered treadmill for poultry according to the sixth embodiment of the present invention.

Referring to FIG. 15, the structure of the gravity-powered treadmill for poultry 100*f* of the sixth embodiment is basically the same as that of the gravity-powered treadmill for poultry 100*b* of the second embodiment, with the following differences.

In the gravity-powered treadmill for poultry 100*f* of the sixth embodiment, the connecting rod 60' is located above the rotating platform 10 and is in the shape of "Π". Correspondingly, the angle adjusting tube 80' is a straight tube, and the angle adjusting tube 80' is fixedly connected with the standing support 31 by means of a fastener 90 (such as a screw).

While in the gravity-powered treadmill for poultry 100*b* of the second embodiment, the connecting rod 60 is in the shape of "L" with one section spaced parallel below the rotating platform 10 and the other section spaced laterally beside the rotating platform 10. Correspondingly, the angle adjusting tube 80 includes the first tube 81 sleeved over the standing support 31, the second tube 82 intersecting perpendicularly with the first tube 81, and the fastener 83 inserted through the second tube 82.

Apart from the differences mentioned above, the rest structures are the same and will not be repeated here.

Figure 16:
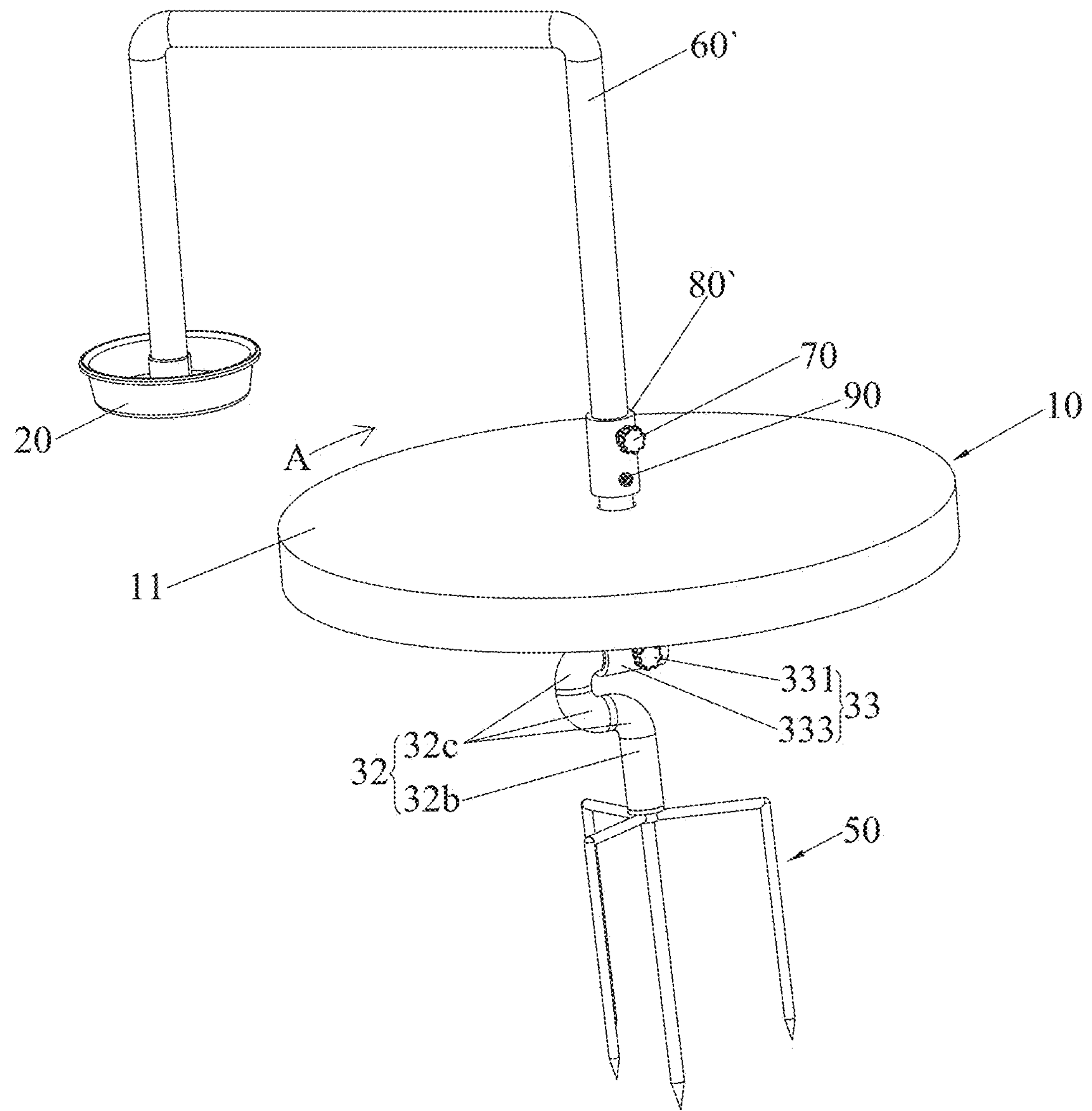
FIG. 16 is a perspective view of the gravity-powered treadmill for poultry according to the seventh embodiment of the present invention.

Referring to FIG. 16, the structure of the gravity-powered treadmill for poultry 100*g* of the seventh embodiment is basically the same as that of the gravity-powered treadmill for poultry 100*c* of the third embodiment, with the following differences.

In the gravity-powered treadmill for poultry 100*g* of the seventh embodiment, the connecting rod 60' is located above the rotating platform 10 and is in the shape of "Π". Correspondingly, the angle adjusting tube 80' is a straight tube, and the angle adjusting tube 80' is fixedly connected with the standing support 31 by means of a fastener 90 (such as a screw).

While in the gravity-powered treadmill for poultry 100*c* of the third embodiment, the connecting rod 60 is in the shape of "L" with one section spaced parallel below the rotating platform 10 and the other section spaced laterally beside the rotating platform 10. Correspondingly, the angle adjusting tube 80 includes the first tube 81 sleeved over the standing support 31, the second tube 82 intersecting perpendicularly with the first tube 81, and the fastener 83 inserted through the second tube 82.

Apart from the differences mentioned above, the rest structures are the same and will not be repeated here.

Figure 17:
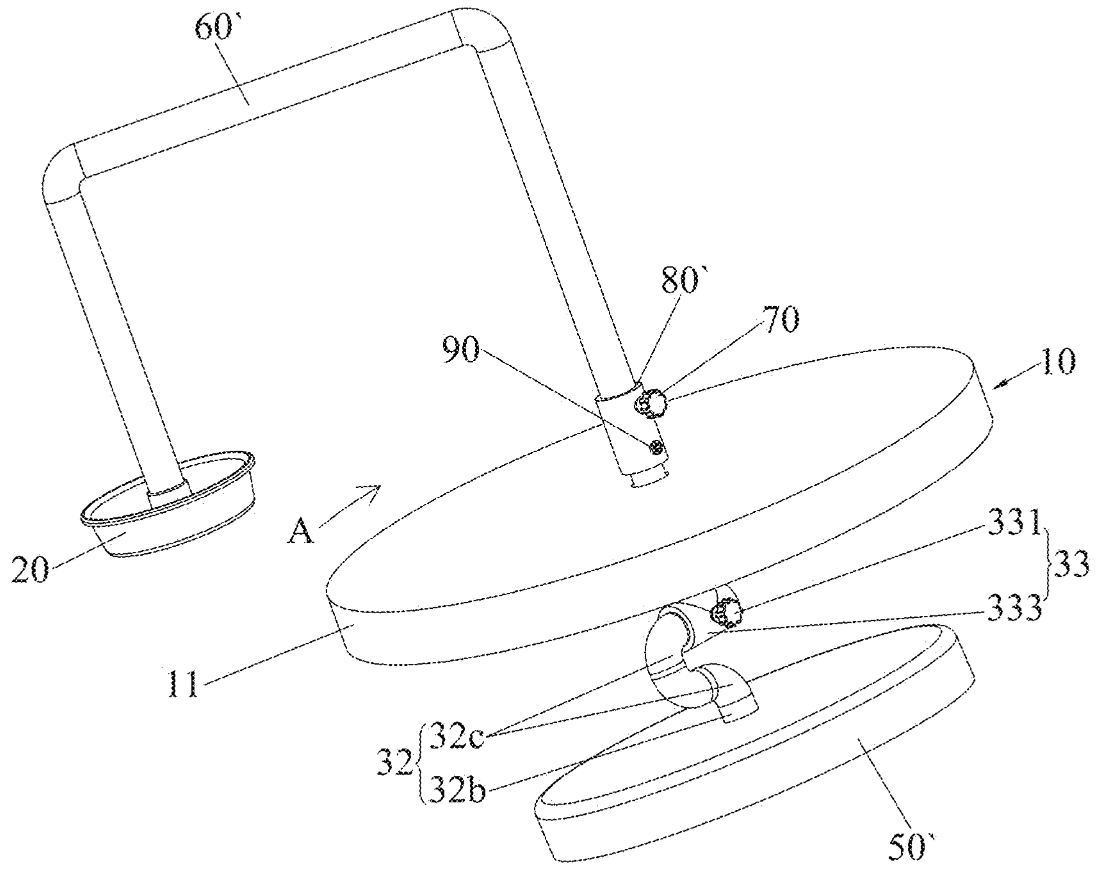
FIG. 17 is a perspective view of the gravity-powered treadmill for poultry according to the eighth embodiment of the present invention.

Referring to FIG. 17, the structure of the gravity-powered treadmill for poultry 100*h* of the eighth embodiment is basically the same as that of the gravity-powered treadmill for poultry 100*d* of the fourth embodiment, with the following differences.

In the gravity-powered treadmill for poultry 100*h* of the eighth embodiment, the connecting rod 60' is located above the rotating platform 10 and is in the shape of "Π", Correspondingly, the angle adjusting tube 80' is a straight tube, and the angle adjusting tube 80' is fixedly connected with the standing support 31 by means of a fastener 90 (such as a screw).

While in the gravity-powered treadmill for poultry 100*d* of the fourth embodiment, the connecting rod 60 is in the shape of "L" with one section spaced parallel below the rotating platform 10 and the other section spaced laterally beside the rotating platform 10. Correspondingly, the angle adjusting tube 80 includes the first tube 81 sleeved over the standing support 31, the second tube 82 intersecting perpendicularly with the first tube 81, and the fastener 83 inserted through the second tube 82.

Apart from the differences mentioned above, the rest structures are the same and will not be repeated here.

Compared with the prior art, the rotating platform 10 of the present invention is rotatably assembled on the mounting frame 30, the rotating platform 10 is inclined relative to the horizontal plane P when in use, and the container 20 is arranged beside the upwardly inclined side 11 of the rotating platform 10. When the poultry jumps onto the rotating platform 10 for eating the feed in the container 20 above the rotating platform 10, the poultry has to walk towards the upwardly inclined side 11 of the rotating platform 10. When the poultry walks upwards, the rotating platform 10 will rotate downwards due to the gravity. The faster the poultry runs upwards, the faster the rotating platform 10 will rotate downwards. Then the poultry will chase after it at an even faster speed, as a result, the poultry achieves an exercise effect when eating. Moreover, since the rotation of the rotating platform 10 is driven by the gravity of the poultry, there is no need to provide a power source, making the structure of the gravity-powered treadmill for poultry of the present invention simple and the cost low. It should be noted that the wordings "when in use" here refers to that, the mounting frame 30 of the gravity-powered treadmill for poultry of the present invention is fixed to the external structure.

Figure 6:
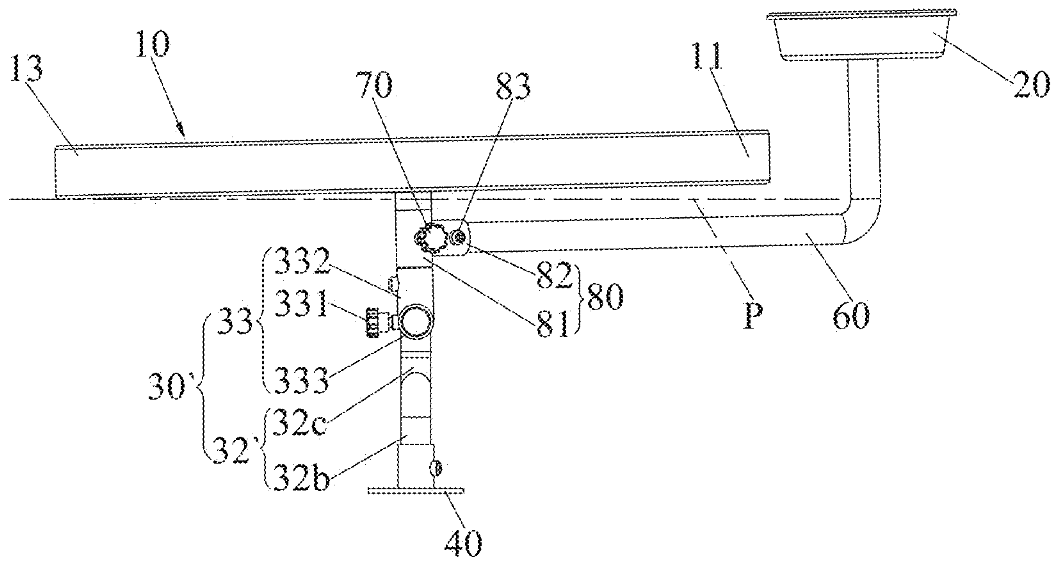
FIG. 6 is a side view of the gravity-powered treadmill for poultry shown in FIG. 5.
Figure 7:
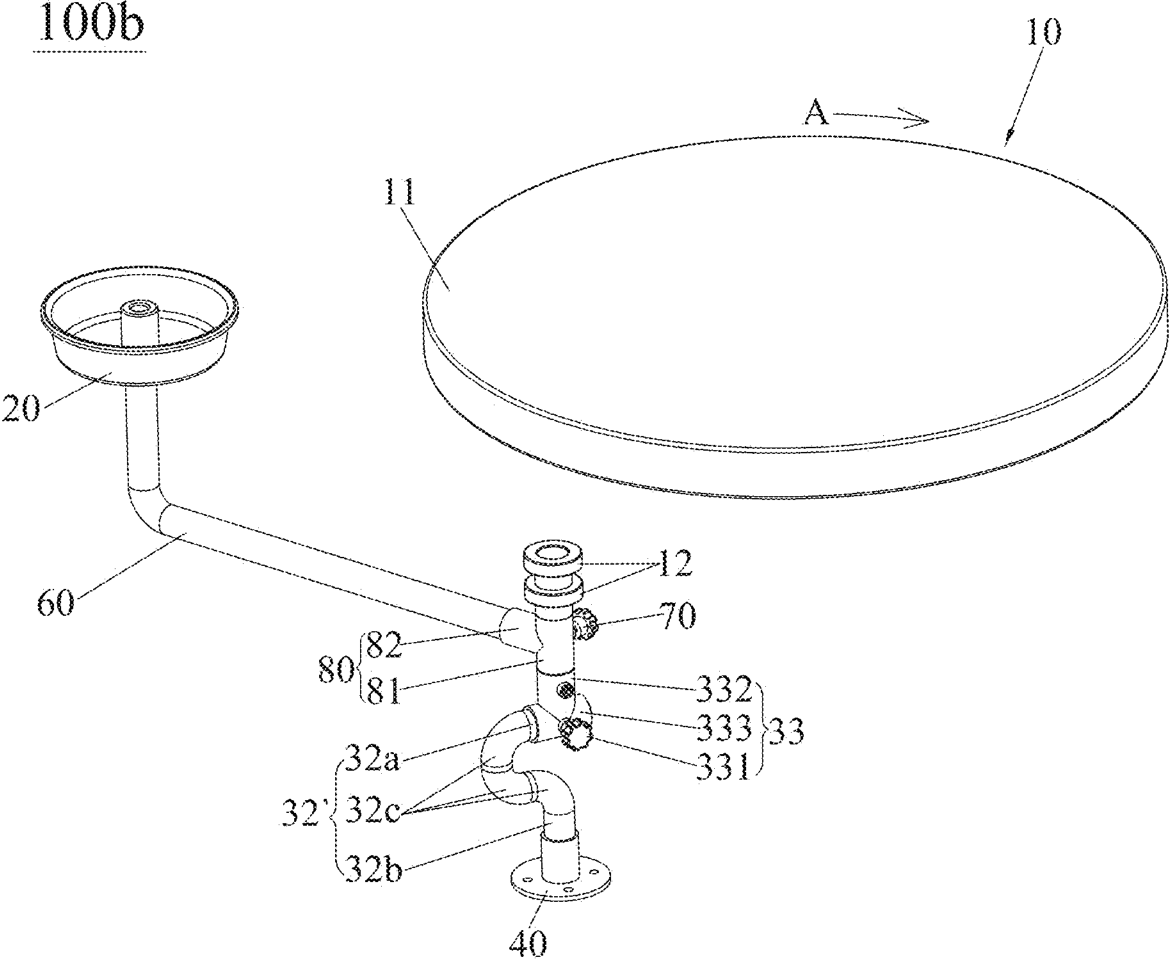
FIG. 7 is an exploded perspective view of the gravity-powered treadmill for poultry shown in FIG. 5.
Figure 8:
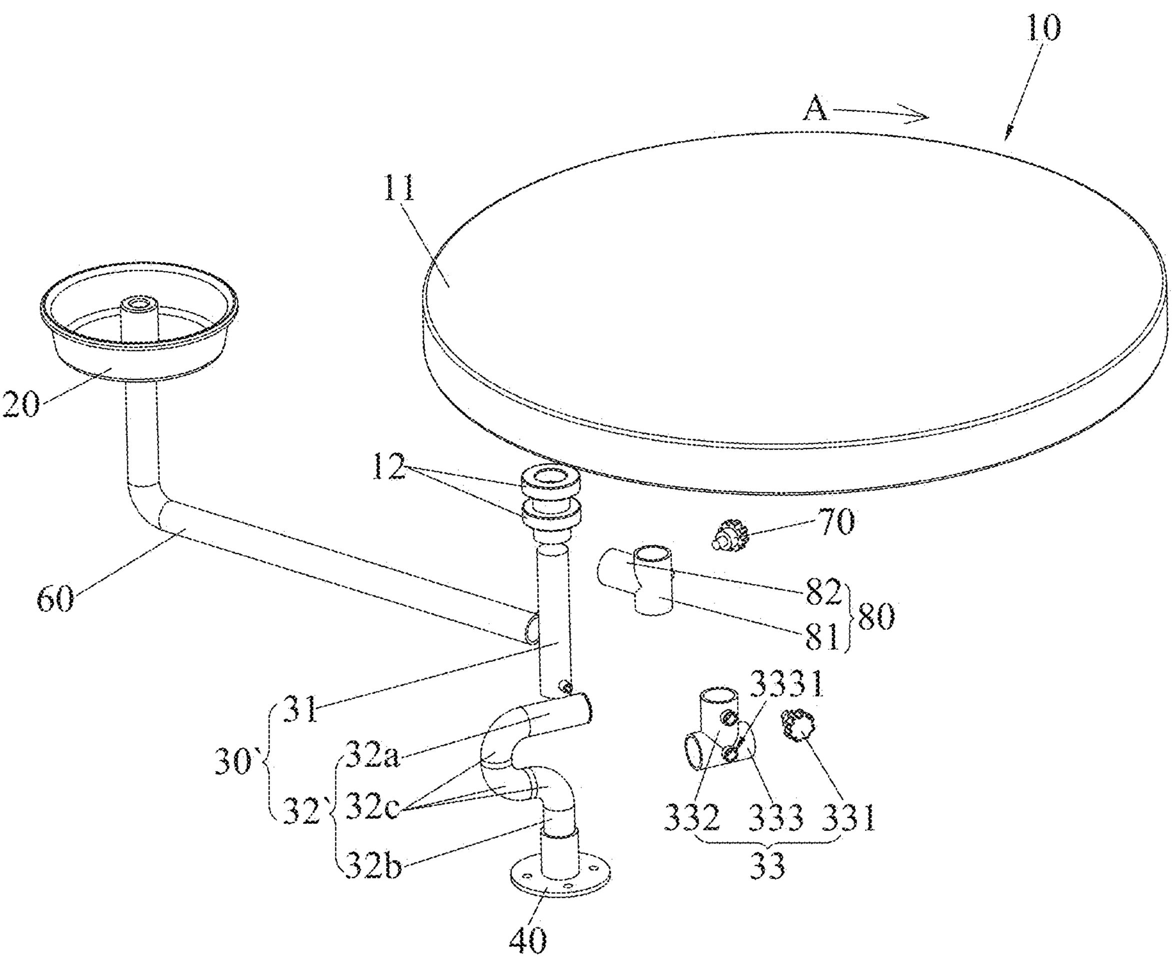
FIG. 8 is a further exploded perspective view of the gravity-powered treadmill for poultry shown in FIG. 7.
Figure 10:
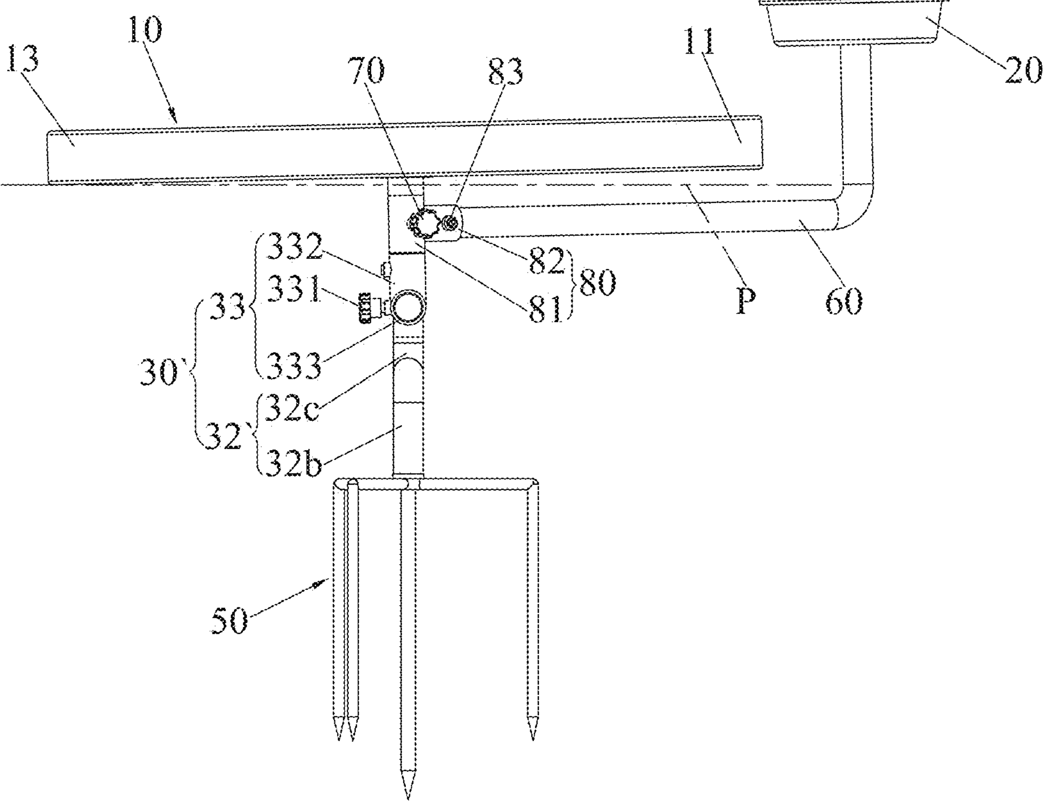
FIG. 10 is a side view of the gravity-powered treadmill for poultry shown in FIG. 9.
Figure 11:
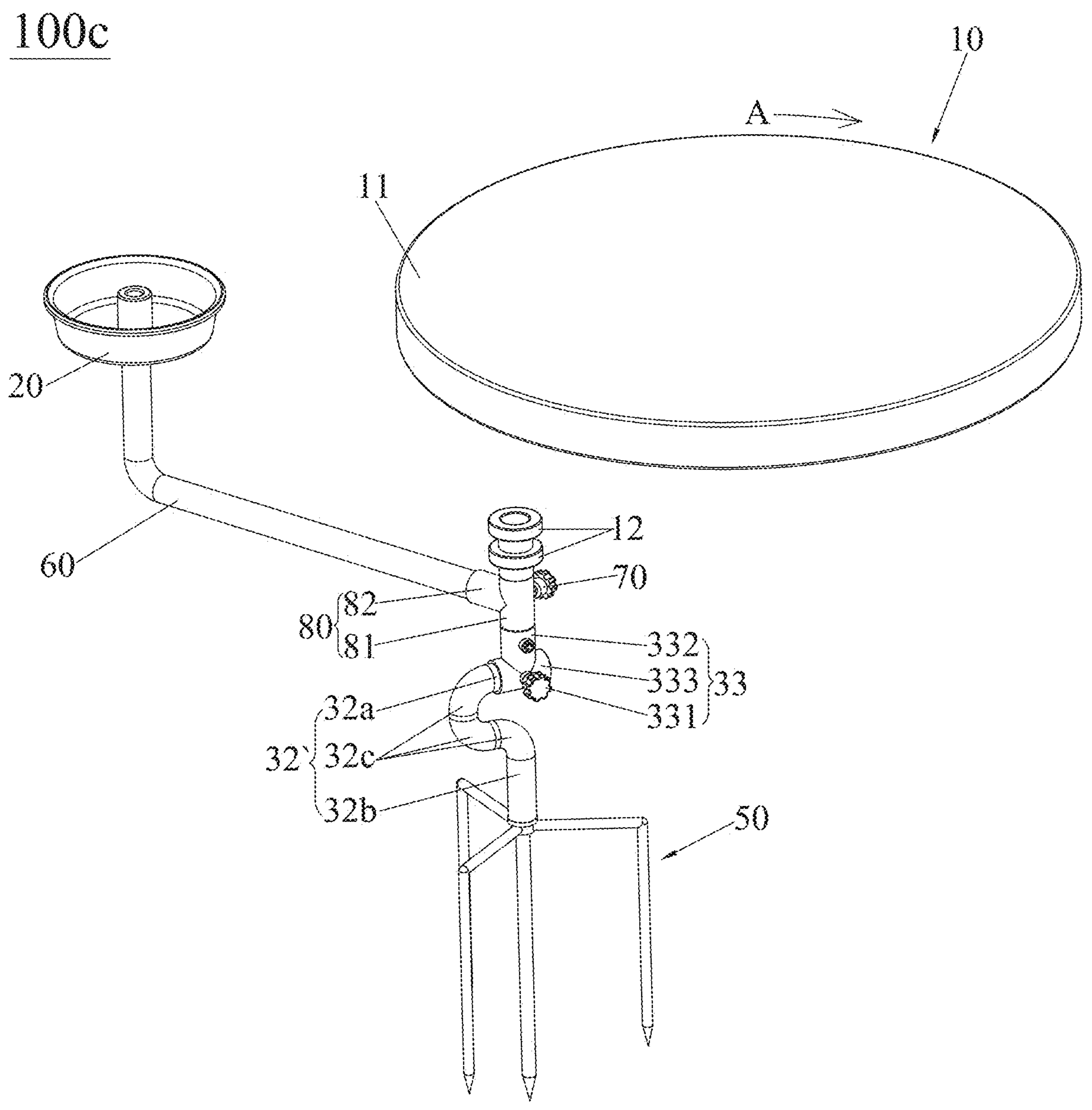
FIG. 11 is an exploded perspective view of the gravity-powered treadmill for poultry shown in FIG. 9.
Figure 12:
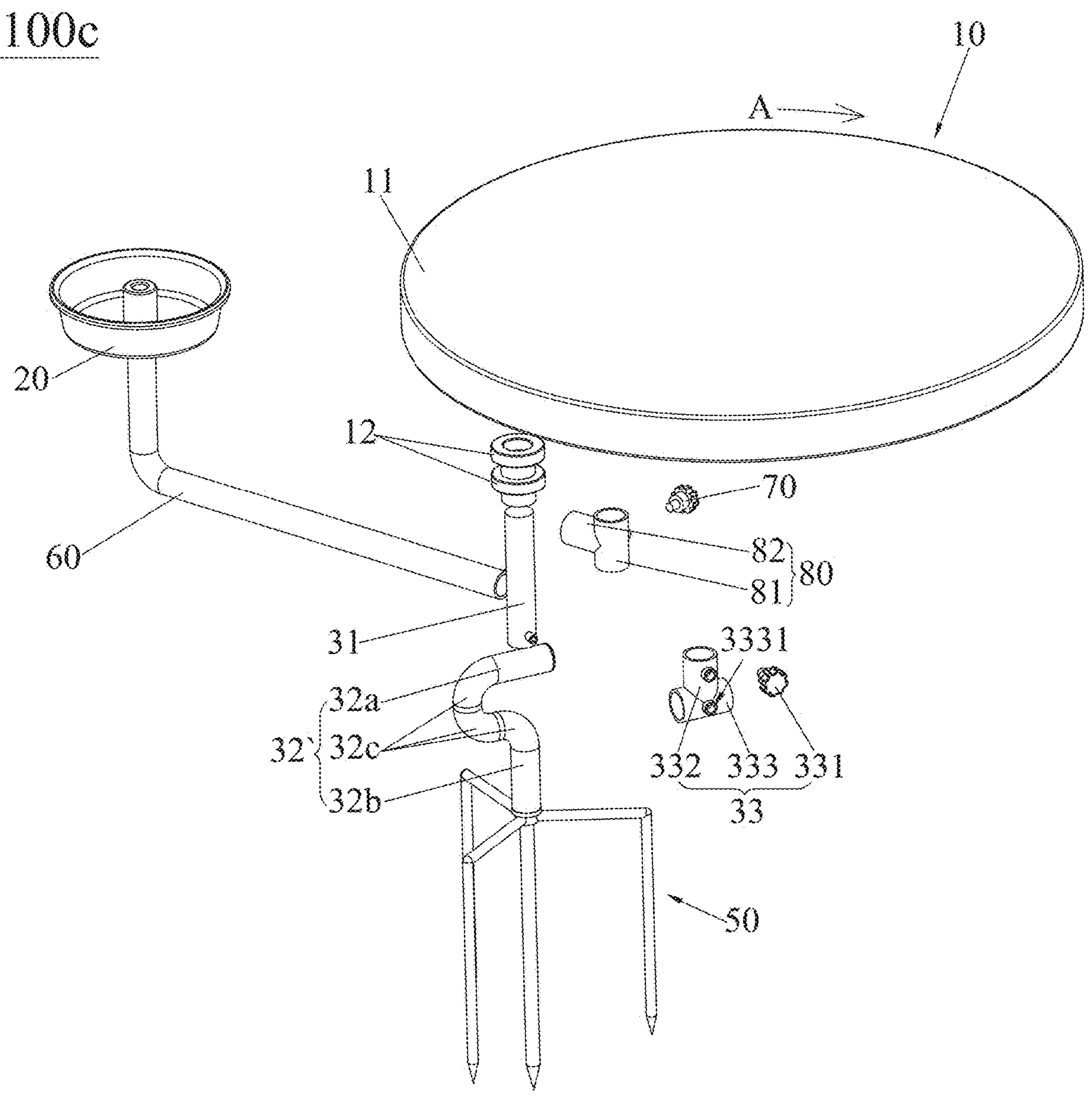
FIG. 12 is a further exploded perspective view of the gravity-powered treadmill for poultry shown in FIG. 11.

It should be noted that, although the container 20 in the figures is shown as a basin-shaped structure, it is clear that, according to actual needs, the container 20 may also be other shapes or forms. In addition, since the rotating platform 10 is inclined relative to the horizontal plane P when in use, the rotating platform 10 has the upwardly inclined side 11 and the relatively downwardly inclined side 13, as shown in FIGS. 2, 6, and 10.

The above descriptions are merely preferred embodiments of the present application and are not intended to limit the scope of the application. Any modifications, equivalent substitutions, or improvements made within the spirit and principles of the present application should be included within the protection scope of the present application.

What is claimed is:

1. A gravity-powered treadmill for poultry, comprising a rotating platform driven by a gravity of poultry, a container for holding poultry feed, and a mounting frame for assembling the rotating platform to an external structure, wherein the rotating platform is rotatably mounted on the mounting frame, the rotating platform is inclined relative to a horizontal plane when in use, and the container is arranged beside an upwardly inclined side of the rotating platform;

wherein the mounting frame comprises a standing support, an intersecting support arranged crosswise with the standing support, and a rotation adjustment device assembled between the standing support and the intersecting support, the rotating platform is rotatably assembled on the standing support from above, a relative position between the standing support and the intersecting support is adjustable via the rotation adjustment device, thereby tilting the rotating platform relative to the horizontal plane;

the gravity-powered treadmill for poultry further comprises:

a connecting rod for connecting the container to the mounting frame, wherein the container is suspended above a corresponding position of the rotating platform via the connecting rod; and an angle adjusting fastener and an angle adjusting tube for adjusting a position of the container along a rotation direction of the rotating platform, wherein the angle adjusting tube is sleeved over the standing support and rotatable around the standing support, the connecting rod is connected with the angle adjusting tube, and the angle adjusting fastener is inserted through the angle adjusting tube and selectively fasten or unfasten the standing support and the angle adjusting tube;

wherein the angle adjusting tube comprises a first tube sleeved over the standing support, a second tube intersecting perpendicularly with the first tube, and a fastener inserted through the second tube; an end of the connecting rod is sleeved inside the second tube, the fastener is used to fasten the connecting rod, and the angle adjusting fastener is inserted through the first tube.

2. The gravity-powered treadmill for poultry according to claim 1, wherein the rotation adjustment device comprises an adjusting fastener, a first connecting member and a second connecting member that are crosswise arranged and connected together, the first connecting member is assembled with the standing support, and the second connecting member is assembled with the intersecting support, the adjusting fastener is configured to selectively fasten or unfasten the second connecting member and the intersecting support.

3. The gravity-powered treadmill for poultry according to claim 2, wherein the standing support is perpendicular to the rotating platform and the intersecting support respectively.

4. The gravity-powered treadmill for poultry according to claim 2, wherein the first connecting member is a tube sleeved over the standing support, the second connecting member is a tube sleeved over the intersecting support, and the adjusting fastener is rotatably inserted through the second connecting member.

5. The gravity-powered treadmill for poultry according to claim 4, wherein the second connecting member is provided with a threaded hole for threaded connection with the adjusting fastener, the adjusting fastener is extended into the second connecting member through the threaded hole and is configured to selectively pressed against or release the intersecting support.

6. The gravity-powered treadmill for poultry according to claim 1, wherein the intersecting support is a horizontal rod perpendicular to the standing support, and an end of the horizontal rod is connected with a flange seat.

7. The gravity-powered treadmill for poultry according to claim 1, wherein the intersecting support comprises an intersecting section arranged crosswise the standing support, an aligned section located below the intersecting section and vertically aligned with the standing support, and a curved section connected between the intersecting section and the aligned section; and an end of the aligned section is connected with a flange seat, a base or an insert.

8. The gravity-powered treadmill for poultry according to claim 1, wherein the connecting rod is in a shape of "L", with one section of the connecting rod spaced parallel below the rotating platform and the other section of the connecting rod spaced laterally beside the rotating platform.

9. A gravity-powered treadmill for poultry, comprising a rotating platform driven by a gravity of poultry, a container for holding poultry feed, and a mounting frame for assembling the rotating platform to an external structure, wherein the rotating platform is rotatably mounted on the mounting frame, the rotating platform is inclined relative to a horizontal plane when in use, and the container is arranged beside an upwardly inclined side of the rotating platform;

wherein the mounting frame comprises a standing support, an intersecting support arranged crosswise with the standing support, and a rotation adjustment device assembled between the standing support and the intersecting support, the rotating platform is rotatably assembled on the standing support from above, a relative position between the standing support and the intersecting support is adjustable via the rotation adjustment device, thereby tilting the rotating platform relative to the horizontal plane;

the gravity-powered treadmill for poultry further comprises:

a connecting rod for connecting the container to the mounting frame, wherein the container is suspended above a corresponding position of the rotating platform via the connecting rod; and an angle adjusting fastener and an angle adjusting tube for adjusting a position of the container along a rotation direction of the rotating platform, wherein the angle adjusting tube is sleeved over the standing support and rotatable around the standing support, the connecting rod is connected with the angle adjusting tube, and the angle adjusting fastener is inserted through the angle adjusting tube and selectively fasten or unfasten the standing support and the angle adjusting tube;

wherein the connecting rod is in a shape of "L", with one section of the connecting rod spaced parallel below the rotating platform and the other section of the connecting rod spaced laterally beside the rotating platform.

* * * * *